United States Patent
Kluft

(10) Patent No.: US 10,105,809 B2
(45) Date of Patent: Oct. 23, 2018

(54) DEVICE AND METHOD FOR MEASURING AND MONITORING TOOLS

(71) Applicant: SANDVIK TOOLING DEUTSCHLAND GMBH, Dusseldorf (DE)

(72) Inventor: Werner Kluft, Aachen (DE)

(73) Assignee: SANDVIK TOOLING DEUTSCHLAND GMBH, Dusseldorf (DE)

( * ) Notice: Subject to any disclaimer, the term of this patent is extended or adjusted under 35 U.S.C. 154(b) by 104 days.

(21) Appl. No.: 15/125,905

(22) PCT Filed: Mar. 13, 2015

(86) PCT No.: PCT/EP2015/055297
§ 371 (c)(1),
(2) Date: Sep. 13, 2016

(87) PCT Pub. No.: WO2015/136075
PCT Pub. Date: Sep. 17, 2015

(65) Prior Publication Data
US 2017/0008141 A1    Jan. 12, 2017

(30) Foreign Application Priority Data

Mar. 14, 2014  (DE) ........................ 10 2014 204 833

(51) Int. Cl.
| | | |
|---|---|---|
| *B23Q 15/20* | (2006.01) | |
| *B23Q 17/22* | (2006.01) | |
| *B23Q 17/09* | (2006.01) | |
| *G05B 19/4065* | (2006.01) | |

(52) U.S. Cl.
CPC ...... *B23Q 17/2241* (2013.01); *B23Q 17/0957* (2013.01); *G05B 19/4065* (2013.01); *G05B 2219/37247* (2013.01)

(58) Field of Classification Search
CPC ............ B23Q 17/2241; B23Q 17/0957; G05B 19/4065; G05B 2219/37247
See application file for complete search history.

(56) References Cited

FOREIGN PATENT DOCUMENTS

| | | |
|---|---|---|
| DE | 19747798 A1 | 5/1999 |
| EP | 1197819 A2 | 4/2002 |
| EP | 1226793 A2 | 7/2002 |
| EP | 1897656 A2 | 3/2008 |
| EP | 2151725 A1 | 2/2010 |
| JP | S5621748 A | 2/1981 |

(Continued)

*Primary Examiner* — Daniel Howell
*Assistant Examiner* — Paul M Janeski
(74) *Attorney, Agent, or Firm* — Corinne R. Gorski

(57) ABSTRACT

A device for measuring and monitoring tools of a machine tool, wherein the machine tool comprises a spindle shaft for the tool, the shaft being arranged in a spindle housing, wherein a work piece with good electric conductivity can be machined using the tool, wherein the spindle shaft is electrically insulated from the spindle housing, includes a measuring and monitoring system. The measuring and monitoring system measures at least one electric measurement, which depends on the contacting state between the tool and the work piece. A rotary transmitter contacts the rotating spindle shaft to measure the measurement detectable between the tool and the work piece, wherein the rotary transmitter is connected with the spindle housing in an electrically insulated manner.

14 Claims, 3 Drawing Sheets

(56) References Cited

FOREIGN PATENT DOCUMENTS

| | | |
|---|---|---|
| JP | 2005034934 A | 2/2005 |
| WO | 2006128892 A1 | 12/2006 |
| WO | 2012063621 A1 | 5/2012 |

DEVICE AND METHOD FOR MEASURING AND MONITORING TOOLS

RELATED APPLICATION DATA

This application is a § 371 National Stage Application of PCT International Application No. PCT/EP2015/055297 filed Mar. 13, 2015 claiming priority of DE Application No. 102014204833.8, filed Mar. 14, 2014.

TECHNICAL FIELD

The invention relates to a device and a method for measuring and monitoring tools.

BACKGROUND

From WO2006/128892 A1 a method and a device are known for detecting the breakage of tools of a machine tool, comprising a measuring and monitoring system for breakage detection, wherein the machine tool comprises a spindle shaft for the tool which machines work pieces with good electric conductivity. The measuring and monitoring system measures at least one electric measurement which depends on the contacting state between the tool and the work piece, wherein hybrid bearings support the spindle shaft and electrically insulate the same against the machine tool, wherein a contact element contacts the rotating spindle shaft to measure the measurement detectable between the tool and the work piece.

However, it is very complicated to provide contact elements to measure the measurement detectable between the tool and the work piece.

Therefore, it is an object of the present invention to simplify a device and a method for measuring and monitoring tools.

SUMMARY

According to the present invention a device for measuring and monitoring tools of a machine tool is provided, wherein a rotary transmitter contacts the rotating spindle shaft to measure the measurement detectable between the tool and the work piece, wherein the rotary transmitter is connected with the spindle housing in an electrically insulated manner.

Preferably, a ceramic layer is provided for insulation between the rotary transmitter and the spindle housing. A shaft in the rotary transmitter, which is electrically and mechanically connected with the spindle shaft, is supported preferably by at least one electrically conductive steel bearing, whereas other bearings may well be hybrid bearings.

This is advantageous in that the spindle shaft can be contacted in a simple manner via the housing of the rotary transmitter and the spindle shaft is still electrically insulated with respect to the spindle housing.

The measuring and monitoring system may include at least one first bleeder resistance which may be activated in a state in which the measuring and monitoring system performs no measurement, so that electrostatic charges can be dissipated from the spindle shaft.

Owing to the fact the that spindle shaft and the spindle housing are electrically insulated from each other, there is a disadvantage that electrostatic charges of the spindle shaft cannot be dissipated to the spindle housing or the electric ground provided there. However, this may result in possible spark-over in the machine or between the tool and the work piece or also in the spindle, e.g. in or at the bearings. These sparks may result in explosions, fires or deflagrations in the machine and/or in significant damages to the bearings.

Due to the fact that the measuring and monitoring system includes a first bleeder resistance which may be activated in a state in which the measuring and monitoring system performs no measurement, it is possible to dissipate the electrostatic charge from the spindle shaft. In this manner, a spark-over and also a sparking can be prevented.

A state in which the measuring and monitoring system does not perform a measurement is a state in which the electric measurement is not detected or not used or evaluated.

The magnitude of the first bleeder resistance should be selected such that, with consideration to the electric resistance of the electrically conductive bearing connected in series with the same, it is sufficiently small to dissipate the maximum possible amount of electric charge on the spindle shaft to ground in a quick and sufficient manner. It should not significantly increase the electric resistance of the steel bearing (ca. 10 to 80 ohm in case of permanent grease lubrication) due to the series connection with the same, whereby the first bleeder resistance is significantly smaller than the electric resistance and can be configured with a dimension of less than 10 ohm.

The first bleeder resistance is activated whenever no contact can be expected between the tool and the work piece, so as to dissipate electrostatic charges of the spindle in a quick, reliable and sufficient manner. Thereby, a danger of an electric shock is excluded which could occur while machine operators are working in the working range of the machine and when touching the spindle shaft or the tool.

In a state in which the measuring and monitoring system performs a measurement, i.e. when a contact between the tool and the work piece exists or can be expected, the first bleeder resistance is not activated so as to allow the measuring process.

The measuring and monitoring system may comprise at least a second bleeder resistance which may be activated in an operating state in which the measuring and monitoring system performs a measurement. This is done in times in which a contact between the tool and the work piece is expected, i.e. when the tool travels toward the work piece until a work piece/tool contact is made. It must be provided that the electric charges of the spindle shaft that can maximally be induced into the shaft during this traveling process can be dissipated immediately and safely via the second bleeder resistance, so that electrostatic charges of the spindle shaft cannot occur during this time.

Since the charges that can maximally be induced into the shaft during this short period of the measuring process are significantly smaller than the electrostatic charges that can maximally be induced into the spindle shaft and are safely dissipated by means of the very small first bleeder resistance, the second bleeder resistance can be dimensioned significantly larger than the first bleeder resistance. It also has to be significantly larger than the sum of the resistances of the series connection of the measuring circuit in case of a tool/work piece contact, which is formed by the resistances of the parts or components which are the rotary transmitter housing, the steel bearing and the shaft in the rotary transmitter, the spindle shaft, the tool, the work piece and the carriage with the bed, since it is parallel to the same.

The magnitude of the second bleeder resistance also has to be selected such that it is small enough to securely dissipate the above mentioned electrostatic charges during measurement. On the other hand it must be significantly greater that the overall resistance of the above mentioned measuring circuit in case of a tool/work piece contact so that the measurements to be measured between the tool and the work piece are still detectable.

The measuring circuit resistance is less than 150 Ohm in case of a contact between the tool and the work piece. Thus the second bleeder resistance should be greater than 1 kilo ohm, preferably greater than 1.5 kilo ohm.

The spindle shaft and the spindle housing are electrically insulated from each other, and in the normal state the insulation resistance of the air gap between them is more than 1 mega ohm. If, due to leakage or other circumstances, cooling lubricant gets into the space between the spindle shaft and the spindle housing, the electric resistance between the spindle shaft and the spindle housing is clearly reduced thereby. The resistance between the spindle shaft and the spindle housing is less than 50 kilo ohm, if cooling lubricant is present in the space between the spindle shaft and the spindle housing.

This third state is also detectable by means of the measuring and monitoring system by deactivating both bleeder resistances for a very short time during periods in which the tool is not in contact with the work piece, so as to detect the electric measurement without influence from the bleeder resistances. With short interruptions of the processing, such a measurement may be performed once a day or once a week and takes less than a second each time. Incipient spindle damages due to leakage can thereby be detected in time and thus actual spindle damages can be reduced or prevented.

The electric measurement which depends on the contacting state between the tool and the work piece and which can be detected may be the electric resistance, the electric conductivity, the electric inductivity, the electric capacitance or the electric impedance.

Using the detectable electric measurement depending on the tool and the work piece, it is possible to detect e.g. a tool breakage, a missing tool or the work piece/tool contact.

According to the present invention a method for measuring and monitoring tools of a machine tool may be provided comprising a spindle shaft for the tool, the shaft being arranged in a spindle housing, and a measuring and monitoring system. Using the measuring and monitoring system, at least one electric measurement depending on the contacting state between the tool and the work piece is measured, wherein work pieces with good electric conductivity, e.g. metals, are machined, wherein the spindle housing is insulated from the spindle shaft. A rotary transmitter contacts the rotating spindle shaft to measure the measurement detectable between the tool and the work piece, wherein the rotary transmitter is connected with the spindle housing in an electrically insulated manner and has at least one electrically conductive bearing between its shaft and its housing.

In the measuring and monitoring system at least a first bleeder resistance can be activated for the dissipation of electrostatic charges when, as described above, the measuring and monitoring system does not perform a measurement.

When the measuring and monitoring system performs a measurement, as described above, a second bleeder resistance may be activated instead of the first bleeder resistance, which second bleeder resistance is greater than the first bleeder resistance, so that newly forming electrostatic charges can be dissipated also during measuring.

When the tool is not in contact with the work piece, the first bleeder resistance and, if present, at the same time also the second bleeder resistance may be deactivated for a short time, so that, using the electric measurement, the measuring and monitoring system can measure the measurement between the spindle shaft and the spindle housing so as to determine whether coolant lubricant is present between the spindle shaft and the spindle housing.

Further, according to the present invention, a device for measuring and monitoring tools of a machine tool may be provided which is characterized in that for detecting the orientation of the work piece with respect to the machine tool, the work piece is contacted or drilled by the tool (tool touch) and the measuring and monitoring system detects the contact between the tool and the work piece at the moment of contact using the electric measurement and stores the associated position of the work piece or causes it to be stored in the machine control. The communication with the machine control necessary in either case is preferably effected via a field bus.

In this manner the orientation of the work piece relative to the machine tool can be detected in a simple and quick manner. No additional mechanical or optical feeler means to determine the orientation of the work piece. The feeler means and the necessary wireless data transmission means in the working space of the machine tool, as well as the retooling times coming with such means, may become obsolete due to the invention.

For drilling the work piece by means of the tool, the tool tip can be moveable into a defined end position.

The orientation of the work piece can be determined by using the tool to contact or drill the work piece at one or a plurality of positions such as it is done in prior art using mechanical feelers employed today in spindle noses, which feelers are used there instead of a tool.

Further, according to the present invention, a method for measuring and monitoring tools of a machine tool may be provided, comprising a spindle shaft for the tool, the shaft being arranged in a spindle housing, and comprising a measuring and monitoring system with which at least one electric measurement is measured that depends on the contacting state between the tool and the work piece, wherein work pieces with good electric conductivity are machined, wherein the spindle housing is insulated from the spindle shaft, characterized in that for determining the orientation of the work piece relative to the machine tool, the work piece is contacted or drilled by the tool (tool touch), and the moment at which the tool contacts the work piece for the first time is detected using the electric measurement and the associated position of the tool is stored.

Embodiments of the present invention will be explained in detail with reference to the drawings.

DETAILED DESCRIPTION

Figure 1:
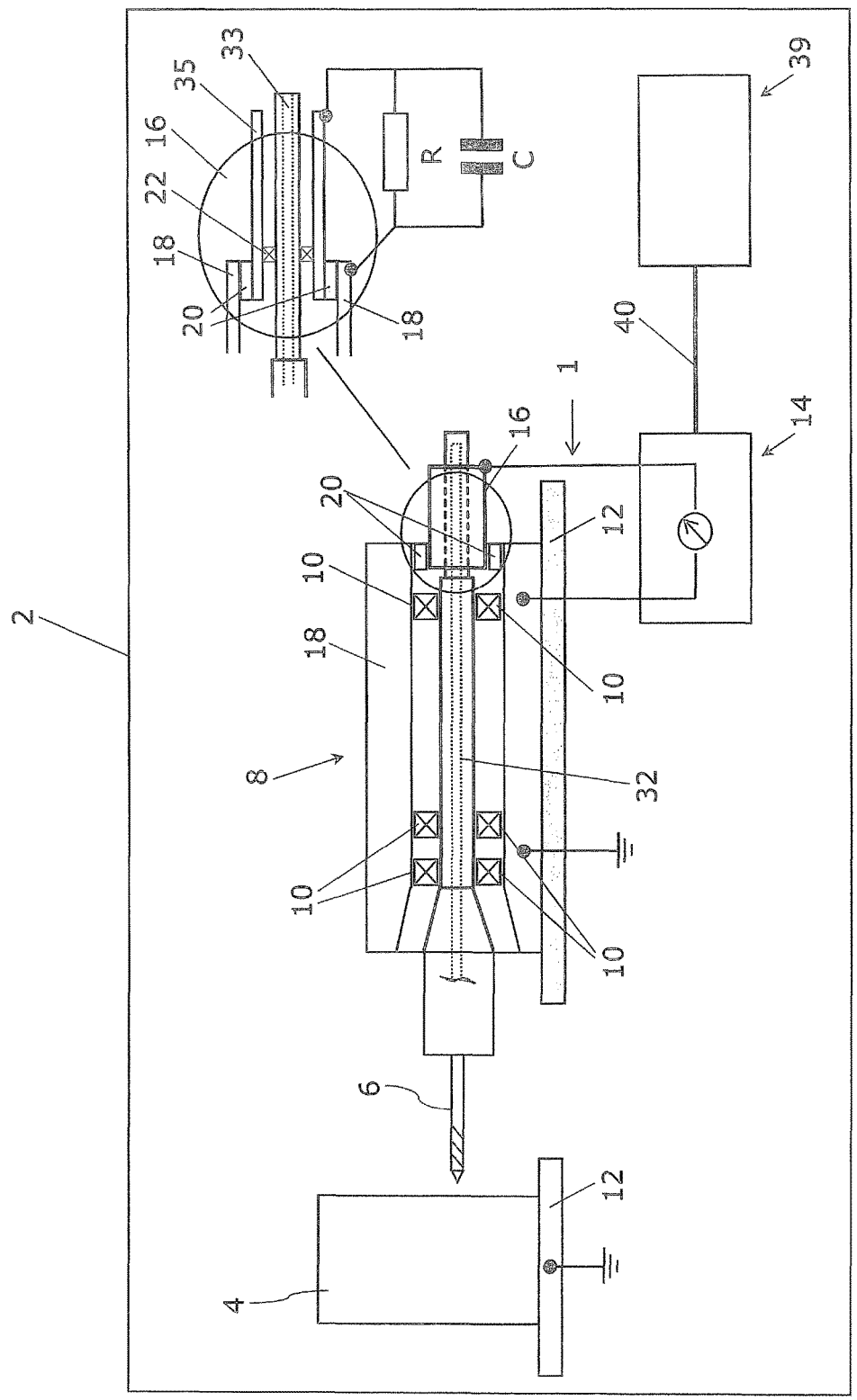
FIG. 1 illustrates a device for measuring and monitoring tools of a machine tool and the machine tool.

FIG. 1 illustrates a machine tool 2 and a device 1 for measuring and monitoring. The machine tool 2 has a spindle 8. The spindle 8 comprises a spindle housing 18 and a spindle shaft 32 for the tool 6, which shaft is arranged in the spindle housing 18. Using the tool 6, a work piece 4 with good electric conductivity can be machined. The spindle shaft 32 is electrically insulated from the spindle housing 18. In the embodiment illustrated the spindle shaft 32 is electrically insulated from the spindle housing 18 using ceramic bearings 10.

Using a measuring and monitoring system 14 it is possible to measure at least one electric measurement which depends on the contacting state between the tool 6 and the work piece 4. Such an electric measurement may be the electric resistance, the electric conductivity, the electric inductance, the electric capacitance or the electric impedance. In this manner the contacting state between the tool 6 and the work piece 4 can be determined. The measuring and monitoring system 14 enables the measurement of the electric measurement between the tool and the work piece at the beginning, during or at the end of a processing cycle or processing phase or in a test cycle and to compare the parameter to threshold values such that in case of a deviation from a normal signal course to beyond the defined threshold limits or of an infringement of the threshold limits by the signal course, it is possible to conclude on a broken or missing tool or simply on the position or the time of contact between the tool and the work piece. Via an electric machine interface 40, preferably a field bus, the machine control 39 of the machine tool 2 can be caused interrupt or stop the processing operation or the test cycle.

As can be seen in FIG. 1, the shaft 33 of the rotary transmitter 16 is mechanically and electrically connected with the rotating spindle shaft 22 to measure the measurement detectable between the tool 6 and the work piece 4, wherein the housing 35 of the rotary transmitter 16 is connected with the spindle housing 18 in an electrically insulated manner. In the embodiment illustrated an electric insulation 20 is provided between the rotary transmitter housing 35 and the spindle housing 18, which insulation is preferably made of ceramic material. Both the spindle shaft 32 and the shaft 33 of the rotary transmitter 16 are preferably hollow to allow the introduction of cooling lubricant.

The shaft 33 of the rotary transmitter 16 is electrically contacted or connected with the housing 35 thereof at least by an electrically conductive bearing 22 which preferably is a steel bearing.

An electric signal flow from the measuring and monitoring system 14 is thereby made possible which flow runs via the components which are the rotary transmitter housing 35, the electrically conductive bearing 22, the shaft 33 of the rotary transmitter, the spindle shaft 32, the tool 6, the work piece 4 and the grounded carriages or the grounded bed 12 to the spindle housing 18 to which also the measuring and monitoring housing 14 is connected. Of course, the signal flow varies drastically between the two states in which the tool 6 is in electric contact with the work piece 4 or not.

Figure 2:
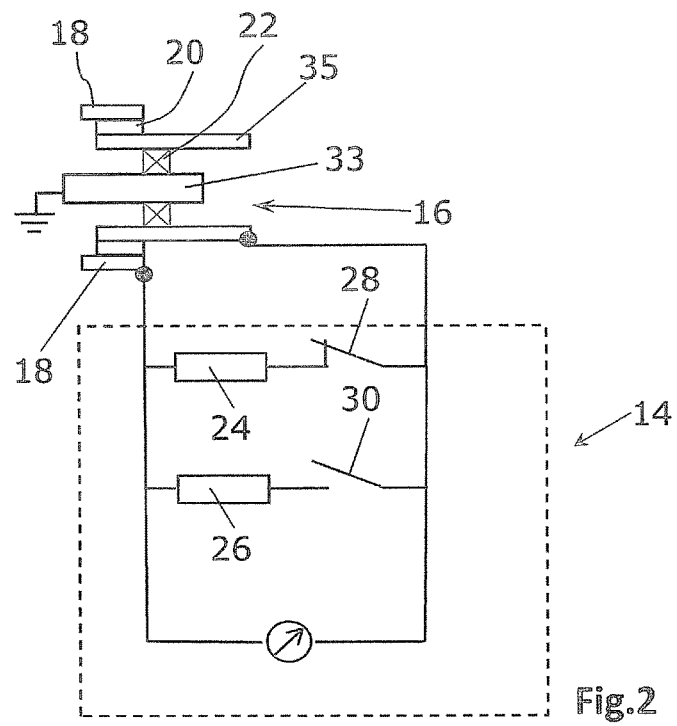
FIG. 2 illustrates the measuring and monitoring system in a first state.
Figure 3:
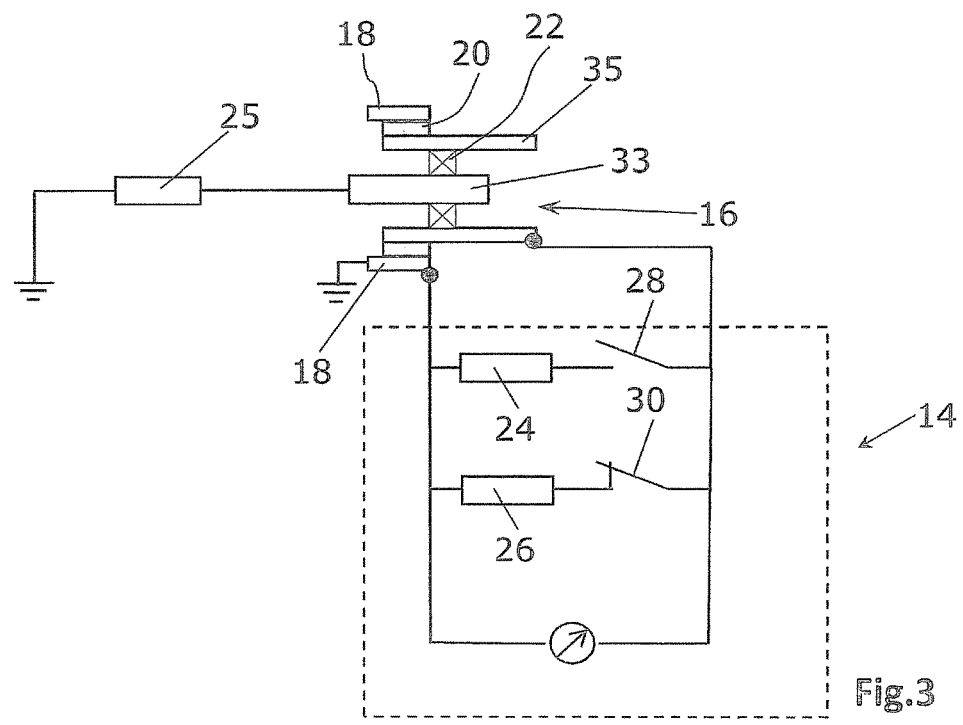
FIG. 3 illustrates the measuring and monitoring system in a second state.
Figure 4:
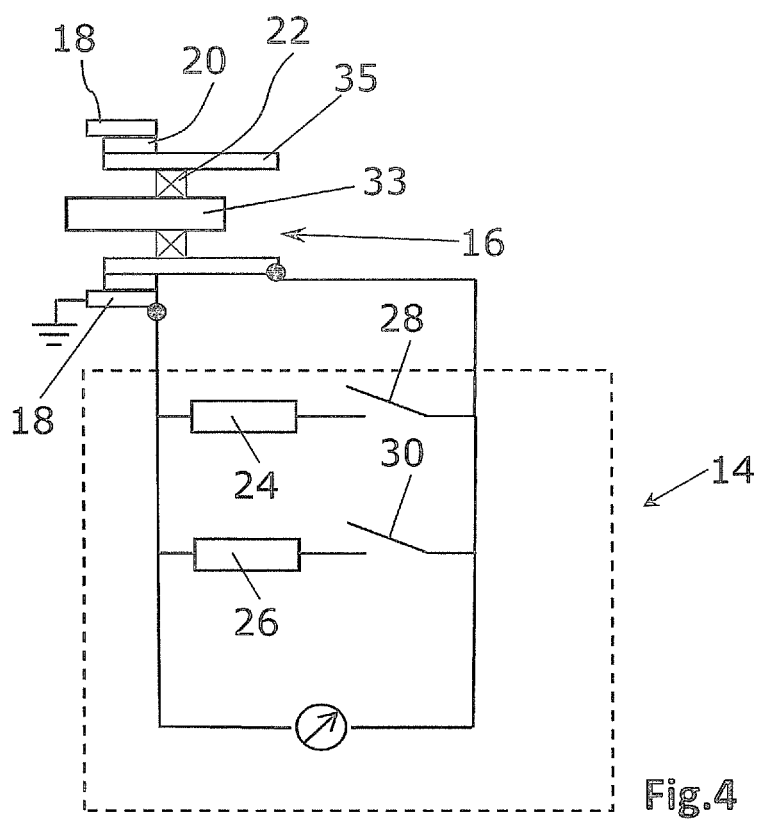
FIG. 4 illustrates the measuring and monitoring system in a third state.

The embodiment of the measuring and monitoring system 14 corresponding to the invention is shown in more detail in FIGS. 2 to 4. It can be seen in FIG. 2 that the measuring and monitoring system preferably has at least a first bleeder resistance 24 that may be activated by means of a controllable switch 28. The first bleeder resistance 24 is activated in a state in which, in normal operation, the measuring and monitoring system 14 performs no measuring operations so that in this case electrostatic charges can be dissipated from the spindle shaft 32 via the measuring and monitoring system 14 towards ground or mass via the electrically conductive bearing 22 and the bleeder resistance 24.

The magnitude of the first bleeder resistance 24 must be selected such that, with consideration to the electric resistance 22 of the electrically conductive bearing connected in series with the same, it is sufficiently small to dissipate the maximum possible amount of electric charge on the spindle shaft 32 to ground in a quick and sufficient manner. It should not significantly increase the electric resistance 22 of the steel bearing (ca. 10 to 80 ohm in case of permanent grease lubrication) due to the series connection with the same, whereby the first bleeder resistance 24 is significantly smaller than the electric resistance 22 and can thus be configured with e.g. less than 10 ohm.

The first bleeder resistance 24 is activated whenever no contact can be expected between the tool and the work piece, so as to dissipate electrostatic charges of the spindle in a quick, reliable and sufficient manner. Thereby, a danger of an electric shock is excluded which could occur while machine operators are working in the working range of the machine and when touching the spindle shaft 32 or the tool 6.

In a state in which the measuring and monitoring system 14 performs a measurement, i.e. when a contact between the tool and the work piece exists or can be expected, the first bleeder resistance 24 is not activated so as to allow the measuring process.

As can be seen in FIG. 2, the measuring and monitoring system 14 may include at least a second bleeder resistance 26. FIG. 3 illustrates a state in which not the first bleeder resistance 24, but the second bleeder resistance 26 is activated using a controllable switch 30. In times in which a contact between the tool and the work piece can be expected, i.e. when the tool 6 travels to the work piece 4 until a work piece/tool contact is made, this bleeder resistance 26 serves to immediately and safely dissipate the electric charges of the spindle shaft 32 that can maximally be induced into the shaft during this traveling process.

Since the charges that can maximally be induced during this short period are significantly smaller than the electrostatic charges that can maximally be induced into the spindle shaft 32 and are safely dissipated by means of the very small first bleeder resistance 24, the bleeder resistance 26 can be dimensioned significantly larger than the bleeder resistance 24. It also has to be significantly larger than the sum of the resistances of the series connection of the measuring circuit which is formed by the resistances of the parts or components 35, 22, 32, 33, 6, 4 and 12, which is substituted in FIG. 3 by the measuring circuit resistance 25. Since the bleeder resistance 26 is connected in parallel with the measuring circuit resistance 25, the former should be chosen to be significantly greater than the measuring circuit resistance 25 in the case that the tool is in contact with the work piece. The second bleeder resistance 26 should also be selected in a state in which, if the contact between the work piece 4 and the tool 6 should be disrupted during measurement, a clear change in the measured electric parameter is determined.

The measuring circuit resistance 26 is less than 150 Ohm in case of a contact between the tool and the work piece. Thus the second bleeder resistance 26 should be greater than 1 kilo ohm, preferably greater than 1.5 kilo ohm.

The second bleeder resistance 26 is activated in an operating state in which the measuring and monitoring system 14 performs a measurement. This means, in a state in which a contact between the tool and the work piece exists or can be expected.

FIG. 4 illustrates a third state in which both bleeder resistances 24 and 26 arranged in parallel with the measuring resistance 25 are deactivated together for a short time via the two controllable switches 28 and 30. In this state the measuring and monitoring system 14 checks the spindle 8 for an undesired presence of leakages in the form of cooling lubricant between the spindle shaft 32 and the spindle housing 18, wherein the tool 6 and the work piece 4 must not be in contact during this short period. With short interruptions of the processing, such a measurement may be performed once a day or once a week and takes less than a second each time. Incipient spindle damages due to leakage can thereby be detected in time and thus actual spindle damages can be reduced or prevented.

A device for measuring and monitoring tools, as illustrated in FIG. 1, may in addition or as an alternative be used to determine the orientation of the work piece 4 relative to the machine tool 2. For this purpose, the work piece 4 is slowly contacted or drilled by the tool 6 (tool touch) and the measuring and control system 14 can use the electric measurement to detect the moment the tool 6 contacts the work piece 4 and can retrieve the associated position of the tool 6 via a fast data transfer with the machine control or NC control 39 of the machine tool 2 and store the same itself. Or, at the moment of contact, the measuring and control system 14 sends a fast contact command to the machine control or the NC control 39, which causes the position measured at that time by the machine control or the NC control 39 to be stored in the machine control or NC control. Preferably, a field bus 40 is used for the data transfer between the measuring and monitoring system 14 and the machine control 39.

Figure 5:
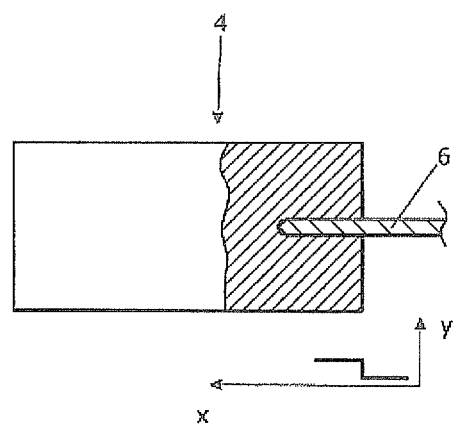
FIG. 5 illustrates a work piece drilled by a tool and the associated course of the measured electric measurement.

FIG. 5 illustrates a work piece 4 into which a tool 6 has been drilled. The course of a measurement is illustrated below the work piece. In the coordinate system, the measurement is plotted on the axis Y and the associated position of the tip of the tool 6 is plotted on the axis X. At the moment of contact between the tip of the tool 6 and the work piece 4, the measurement Y abruptly changes to another level. The associated position of the tool 6 can be stored.

To determine the orientation of the work piece 4, the work piece 4 can be contacted or drilled at one or a plurality of positions using the tool 6 such as it is done in prior art using mechanical feelers employed today in spindle noses, which feelers are used there instead of a tool 6. The tool 6 is moved to a predefined end position. The points where the work piece is drilled are chosen such that is irrelevant to the further functionality of the work piece that small holes or punch marks remain in the work piece at these points.

The invention claimed is:

1. A device for measuring and monitoring tools of a machine tool, the machine tool having a spindle shaft for the tool, the shaft being arranged in a spindle housing, wherein a work piece with good electric conductivity can be machined using the tool, the spindle shaft being electrically insulated from the spindle housing, the device comprising:
    a measuring and monitoring system that measures at least one electric measurement and which depends on a contacting state between the tool and the work piece, the measuring and monitoring system including at least one first bleeder resistance which may be activated in a state in which the measuring and monitoring system performs no measurement, so that electrostatic charges can be dissipated from the spindle shaft; and
    a rotary transmitter that contacts the rotating spindle shaft to measure the at least one electric measurement detectable between the tool and the work piece, wherein the rotary transmitter is connected with the spindle housing in an electrically insulated manner.

2. The device of claim 1, wherein a magnitude of the at least one first bleeder resistance is selected such that it is sufficiently small to dissipate a maximum possible amount of electric charge on the spindle shaft to ground.

3. The device of claim 1, wherein in a state in which the measuring and monitoring system performs a measurement, the at least one first bleeder resistance is not activated and a contact between the tool and the work piece exists or can be expected.

4. The device of claim 1, wherein the measuring and monitoring system includes at least one second bleeder resistance which may be activated in an operating state in which the measuring and monitoring system performs a measurement.

5. The device of claim 4, wherein, in a state in which the tool and the work piece are not in contact or no contact between the tool and the work piece is to be expected, the at least one first and the second bleeder resistances are deactivated at least temporarily so that using the electric measurement measured by the measuring and monitoring system, the presence of cooling lubricant between the spindle shaft and the spindle housing can be detected without any influence from the first and second bleeder resistances.

6. The device of claim 5, wherein the detectable electric measurement, which depends on the contacting state between the tool and the work piece may be the electric resistance, the electric conductivity, the electric inductivity, the electric capacitance or the electric impedance.

7. A machine tool comprising:
    a spindle shaft for the tool, the shaft being arranged in a spindle housing, wherein a work piece with good electric conductivity can be machined using the tool, the spindle shaft being electrically insulated from the spindle housing;
    a measuring and monitoring system arranged to measure at least one electric measurement, which depends on a contacting state between the tool and the work piece, the measuring and monitoring system including at least one first bleeder resistance which may be activated in a state in which the measuring and monitoring system performs no measurement, so that electrostatic charges can be dissipated from the spindle shaft; and
    a rotary transmitter that contacts the rotating spindle shaft to measure the at least one electric measurement and detectable between the tool and the work piece, wherein the rotary transmitter is connected with the spindle housing in an electrically insulated manner.

8. A method for measuring and monitoring tools of a machine tool, the machine tool having a spindle shaft for the tool, the shaft being arranged in a spindle housing, wherein a work piece with good electric conductivity can be machined using the tool, the spindle shaft being electrically insulated from the spindle housing, comprising the steps of:
    providing a measuring and monitoring system with which at least one electric measurement is measured that depends on a contacting state between the tool and the work piece, wherein work pieces with good electric conductivity are machined, the measuring and monitoring system including at least one first bleeder resistance which may be activated in a state in which the measuring and monitoring system performs no measurement, so that electrostatic charges can be dissipated from the spindle shaft;
    providing a rotary transmitter contacting the rotating spindle shaft, wherein the rotary transmitter is connected with the spindle housing in an electrically insulated manner; and
    measuring the at least one electric measurement detectable between the tool and the work piece.

9. The method of claim 8, wherein in the measuring and monitoring system at least one first bleeder resistance may be activated in a state in which the measuring and monitoring system does not perform a measurement, so as to dissipate electrostatic charges.

10. The method of claim 9, wherein, when the measuring and monitoring system performs a measurement, a second bleeder resistance can be activated instead of the first bleeder resistance, the second bleeder resistance being larger than the first bleeder resistance so that electrostatic charges can be dissipated during the measurement.

11. The method of claim 9, wherein, when the tool does not contact the work piece, the first bleeder resistance and, if present, at the same time the second bleeder resistance are deactivated momentarily so that, using the electric measurement, the measuring and monitoring system can measure the measurement between the spindle shaft and the spindle housing to determine whether cooling lubricant is present between the spindle shaft and the spindle housing.

12. A device for measuring and monitoring tools of a machine tool, wherein the machine tool includes a spindle shaft for the tool, the shaft being arranged in a spindle housing, wherein a work piece with good electric conductivity can be machined using the tool, the spindle shaft being electrically insulated from the spindle housing, the device comprising a measuring and monitoring system that measures at least one electric measurement, which depends on a contacting state between the tool and the work piece, for detecting the orientation of the work piece with respect to the machine tool, the work piece can be contacted or drilled by the tool and the measuring and monitoring system detects the contact between the tool and the work piece at the moment of contact using the electric measure and retrieves an associated position of the tool via data transfer with a machine control of the machine tool and stores the same, or causes the position to be stored in the machine control at the time of contact by means of a fast contact command to the machine control, the measuring and monitoring system including at least one first bleeder resistance which may be activated in a state in which the measuring and monitoring system performs no measurement, so that electrostatic charges can be dissipated from the spindle shaft.

13. The device of claim 12, wherein the spindle shaft is movable into a defined end position to drill the work piece with the tool.

14. A method for measuring and monitoring tools of a machine tool, the machine tool having a spindle shaft for the tool, the shaft being arranged in a spindle housing, wherein a work piece with good electric conductivity can be machined using the tool, the spindle shaft being electrically insulated from the spindle housing, comprising the steps of:
providing a measuring and monitoring system with which at least one electric measurement is measured that depends on a contacting state between the tool and the work piece, the measuring and monitoring system including at least one first bleeder resistance which may be activated in a state in which the measuring and monitoring system performs no measurement, so that electrostatic charges can be dissipated from the spindle shaft; and
determining the orientation of the work piece relative to the machine tool, the work piece being drilled by the tool and at a moment at which the tool contacts the work piece for the first time is detected using the electric measurement and an associated position of the tool is stored.

\* \* \* \* \*